US009316784B2

United States Patent
Krishnamoorthy et al.

(10) Patent No.: US 9,316,784 B2
(45) Date of Patent: Apr. 19, 2016

(54) SINGLE-LAYER FULL-MESH, POINT-TO-POINT NETWORK

(75) Inventors: Ashok V. Krishnamoorthy, San Diego, CA (US); Xuezhe Zheng, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 905 days.

(21) Appl. No.: 13/479,109

(22) Filed: May 23, 2012

(65) Prior Publication Data

US 2013/0315526 A1 Nov. 28, 2013

(51) Int. Cl.
G02B 6/12 (2006.01)
G02B 6/28 (2006.01)
G02B 6/34 (2006.01)
G02B 6/42 (2006.01)
G02B 6/43 (2006.01)
G02B 6/293 (2006.01)

(52) U.S. Cl.
CPC ........ G02B 6/12009 (2013.01); G02B 6/29326 (2013.01); G02B 6/29328 (2013.01); G02B 6/43 (2013.01); G02B 6/2938 (2013.01); G02B 2006/12107 (2013.01)

(58) Field of Classification Search
None
See application file for complete search history.

(56) References Cited

U.S. PATENT DOCUMENTS

| 4,927,781 | A * | 5/1990 | Miller | 438/31 |
| 7,502,563 | B2 * | 3/2009 | Nozue et al. | 398/69 |
| 7,558,477 | B2 * | 7/2009 | Chung et al. | 398/5 |
| 2006/0120668 | A1 * | 6/2006 | Iwasaki | 385/47 |
| 2011/0052117 | A1 * | 3/2011 | Tsai et al. | 385/14 |
| 2012/0080672 | A1 * | 4/2012 | Rong et al. | 257/48 |

FOREIGN PATENT DOCUMENTS

CH  EP 1065905 A2 *  1/2001  ............... G02B 6/12

OTHER PUBLICATIONS

Cinato et al. ("Optical interconnections within multichip modules", Optical Engineering, Apr. 1993, vol. 32, No. 4, pp. 852-860).*
Yamanaka et al. ("Optima: 640 Gb/s High-speed ATM Switching system based on 0.25 μmCMOS, MCM-C, and Optical WDM Interconnection", IEEE, 1999 Electronic Components and Technology Conference, 1999, Proceedings, pp. 26-33).*
Jannson et al. ("Optoelectronic Chips and Multichip Modules", IEEE, Electronic Components and Technology Conference, 1992, Proceedings, pp. 804-806).*

(Continued)

*Primary Examiner* — Michelle R Connelly
(74) *Attorney, Agent, or Firm* — Park, Vaughan, Fleming & Dowler LLP; Steven E. Stupp

(57) ABSTRACT

An MCM may include a single optical routing layer that provides point-to-point connectivity among N chips in the MCM, such as all-to-all connectivity or full-mesh point-to-point connectivity. Moreover, the optical routing layer may include: N optical waveguides optically coupled to the N chips and a cyclic de-multiplexer, optically coupled to the N optical waveguides, that routes optical signals among the N optical waveguides without optical-waveguide crossing in the optical routing layer. For example, the cyclic de-multiplexer may include: an array-waveguide-grating (AWG) wavelength router and/or an echelle-grating wavelength router.

20 Claims, 7 Drawing Sheets

(56) References Cited

OTHER PUBLICATIONS

Wren et al. ("Optical Interconnects for Information Distribution Networks", Aerospace and Electronics Conference, 1995, NAECON, 1995, Proceedings of the IEEE, 1995, pp. 425-432).*

Krishnamoorthy, Ashok V. et al., "Computing microsystems based on silicon photonic interconnects", Proceedings of the IEEE,97(7), 1337-1361, 2009.

Chen, H. et al., "Low-loss multimode-interference-based crossings for silicon wire waveguides,"IEEE Photon.Technol. Lett., 18, 2260-2262 (2006).

Bogaerts, W. et al. "Low-loss, low-cross-talk crossings for silicon-on-insulator nanophotonic waveguides," Opt. Lett. 32, 2801-2803 (2007).

Sakamaki, Y. et al. "Low Loss and Low Crosstalk Waveguide Crossings Designed by Wavefront Matching Method," IEEE Photon. Technol. Lett. 18, 2005-2007 (2006).

Popvic, M.A., et al. "Low-loss Bloch waves in open structures and highly compact, efficient Si waveguide-srossing arrays," Proceedings of the 20th Annual Meeting of the IEEE Lasers and Electro-Optics Society (LEOS 2007), Lake Buena Vista, FL, 2007, pp. 56-57.

Zheng, Xuezhe, et al. "Silicon photonic WDM point-to-point network for multi-chip processor interconnects," Group IV Photonics, 2008 5thIEEE International Conference on, pp. 380-382, 2008.

Zheng, Xuezhe et al. "Optical proximity communication using reflective mirrors", Optics Express, 16(19), 15052-15058, (2008).

Lee, D.C. et al. "Monolithic Chip-to-chip WDM Optical Proximity Coupler Utilizing Echelle Grating Multiplexer/ Demultiplexer Integrated with Micro Mirrors Built on SOI Platform," IEEE Photonics Society Summer Topical Meetings, Playa del Carmen, Riviera Maya, Mexico , Jul. 2010.

Yao, Jin et al. , "Grating-coupler based optical interlayer coupling," IEEE Group IV photonics conference, FD3, 2011.

Kato, K. et al. "32x32 full-mesh (1024 path) wavelength routing WDM network based on uniform loss cyclicfrequencyarrayed-waveguide grating," Electron. Lett., vol. 36, pp. 1294-1295, 2000.

Luo, Ying et al., "Echelle Grating With Cyclic Free-Spectral Range", filed Aug. 9, 2011, U.S. Appl. No. 13/205,879.

* cited by examiner

SINGLE-LAYER FULL-MESH, POINT-TO-POINT NETWORK

GOVERNMENT LICENSE RIGHTS

This invention was made with United States Government support under Agreement No. HR0011-08-9-0001 awarded by DARPA. The United States Government has certain rights in the invention.

BACKGROUND

1. Field

The present disclosure generally relates to the design of multi-chip modules (MCMs). More specifically, the present disclosure relates to the design of an MCM that includes a cyclic de-multiplexer in a single optical routing layer that provides full-mesh, point-to-point connectivity among chips in the MCM.

2. Related Art

Engineers are researching a multi-chip module (MCM) that integrates multiple silicon chips together into a logically contiguous piece of silicon larger than a single reticle using high-speed interconnects, such as silicon-photonic wavelength-division-multiplexing (WDM) interconnects. In order to intimately interconnect chip sites within the MCM with low latency and high bandwidth without blocking, a full-mesh, point-to-point interconnect topology with all-to-all connectivity is advantageous.

However, implementing such a fully connected mesh network using silicon optical waveguides on a silicon-on-insulator (SOI) substrate may involve a large number of optical-waveguide crossings. This is illustrated in FIG. 1, which presents a drawing of an existing 8-node, fully connected mesh network topology. In a real implementation with a larger array size, or for large communication bandwidths between sites (where each connection in FIG. 1 would represent a bundle of optical waveguides), there would be a significantly larger number of optical-waveguide crossings. Such optical-waveguide crossings introduce channel loss and crosstalk from interfering channels and are therefore desirable to avoid. Even though special crossing designs manage to reduce the channel loss and crosstalk significantly (less than 0.1 dB insertion loss and less than −40 dB crosstalk), the hundreds of optical-waveguide crossings in an MCM would still significantly impact performance and, therefore, could pose an obstacle to the use of this technology.

One approach to eliminating optical-waveguide crossings is to use surface normal optical proximity couplers (OPxCs) and dual-layer routing. This approach can facilitate scalable full-mesh networks in WDM silicon-photonic links. In such designs, there are typically four OPxC hops in each WDM link. Currently, each OPxC hop introduces a loss of about 3 dB. As a consequence, currently four OPxC hops will add a total of 12 dB to the link loss, which results in large link-loss budget and significantly limits the energy efficiency of the WDM links and the interconnect network as a whole. While there are ongoing improvements in OPxCs, the losses associated with OPxC hops are expected to remain significant. As a consequence, it is desirable to reduce the number of OPxC hops and, thus, the number of routing layers needed to complete the logical connectivity required by the fully connected mesh network.

Hence, what is needed is an MCM that does not suffer from the above-described problems.

SUMMARY

One embodiment of the present disclosure provides a multi-chip module (MCM) that includes: N chips and a single optical routing layer that provides point-to-point connectivity among the N chips. This optical routing layer includes: N optical waveguides optically coupled to the N chips and a cyclic de-multiplexer, optically coupled to the N optical waveguides, that routes optical signals among the N optical waveguides without optical waveguide crossing in the optical routing layer.

Note that the cyclic de-multiplexer may include: an array-waveguide-grating (AWG) wavelength router and/or an echelle-grating wavelength router.

Moreover, the optical routing layer may exclude non-blocking dedicated optical channels among the N chips.

In some embodiments, the optical waveguides are edge coupled to the N chips. Furthermore, the optical waveguides may be optically coupled to the N chips without interlayer optical coupling.

Additionally, the optical routing layer may provide all-to-all connectivity among the N chips.

In some embodiments, the MCM includes a substrate, and the optical routing layer may be disposed on the substrate. Furthermore, the MCM may include: a buried-oxide layer; and a semiconductor layer disposed on the buried-oxide layer. The optical routing layer is disposed on the semiconductor layer, and the substrate, the oxide layer, and the semiconductor layer may comprise a silicon-on-insulator technology.

Note that the optical signals used to communicate among the N chips in the MCM may include at least N carrier wavelengths. Furthermore, note that the point-to-point connectivity may include full-mesh point-to-point connectivity.

Another embodiment provides a system that includes the MCM.

Another embodiment provides a method for communicating among N chips in the MCM. During operation, the MCM receives the optical signals from the N chips using the N optical waveguides, where the N optical waveguides are included in the single optical routing layer that provides point-to-point connectivity among the N chips. Then, the MCM routes the optical signals to the N chips using the cyclic de-multiplexer that is optically coupled to the N optical waveguides, where the cyclic de-multiplexer routes the optical signals among the N optical waveguides without optical waveguide crossing in the optical routing layer. Finally, the MCM outputs the optical signals to the N chips.

Figure 1:
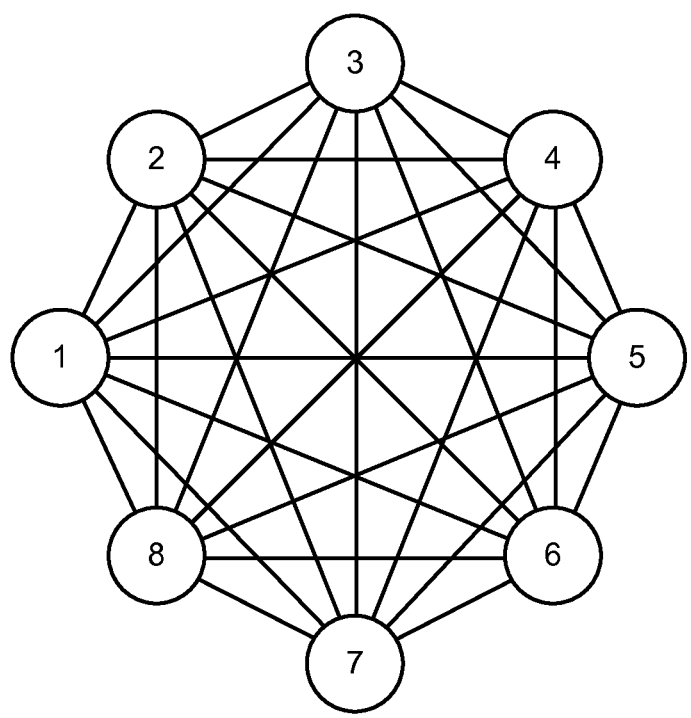
FIG. 1 is a block diagram illustrating an existing fully connected mesh network topology.

Table 1 provides design parameters for an echelle grating in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of a multi-chip module (MCM), a system that includes the MCM, and a method for communicating among N chips in the MCM are described. This MCM may include a single optical routing layer that provides point-to-point connectivity among N chips in the MCM, such as all-to-all connectivity or full-mesh point-to-point connectivity. Moreover, the optical routing layer may include: N optical waveguides optically coupled to the N chips; and a cyclic de-multiplexer, optically coupled to the N optical waveguides, that routes optical signals among the N optical waveguides without optical waveguide crossing in the optical routing layer. For example, the cyclic de-multiplexer may include: an array-waveguide-grating (AWG) wavelength router and/or an echelle-grating wavelength router.

By interconnecting the N chips using the single optical routing layer, the MCM may not need non-blocking dedicated optical channels among the N chips, and may avoid optical-waveguide crossings and interlayer (surface normal) optical coupling (and the associated optical losses). As a consequence, the size, the complexity, the power consumption and the cost of the MCM may be reduced while improving its performance. These attributes may facilitate increased use of the MCM.

We now describe embodiments of the MCM. This MCM includes a single-layer, full-mesh network. In particular, by using an array-waveguide-grating (AWG) wavelength router or an echelle-grating wavelength router (and, more generally, a cyclic de-multiplexer) in a single-photonic routing layer, a point-to-point interconnect network can be implemented with all-to-all connectivity and without optical-waveguide crossings.

Figure 2:
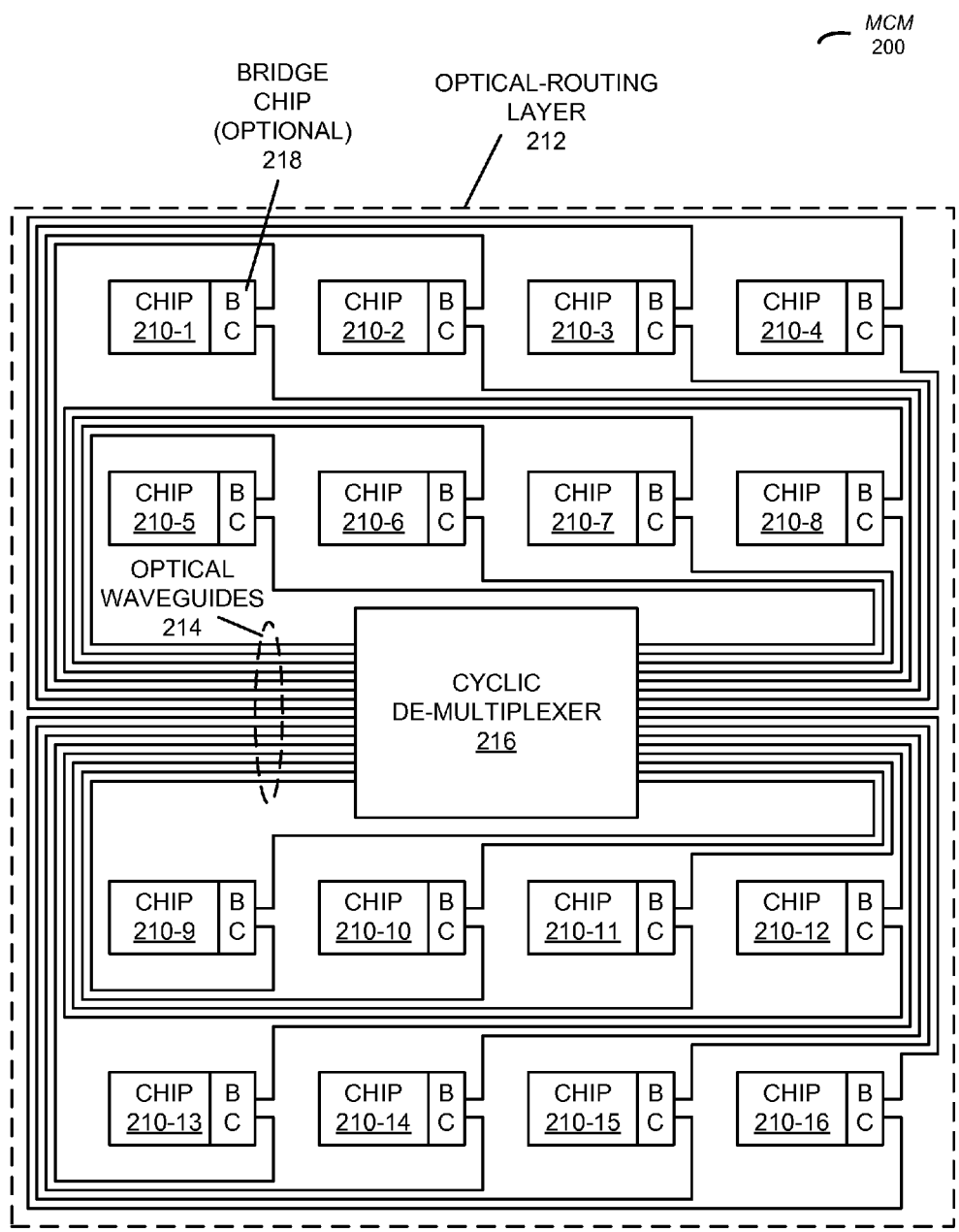
FIG. 2 is a block diagram illustrating a single-layer, full-mesh interconnect network for a 4×4 multi-chip module (MCM) using a cyclic de-multiplexer in accordance with an embodiment of the present disclosure.

FIG. 2 presents a block diagram illustrating a top view of MCM 200 (which is sometimes referred to as a 'macro-chip'). This MCM includes: N chips 210 (where N may be 16) located at 'sites' in MCM 200; and a single optical routing layer 212 that provides point-to-point connectivity among N chips 210. This optical routing layer includes: N optical waveguides 214 optically coupled to the N chips 210; and a cyclic de-multiplexer 216, optically coupled to the N optical waveguides 214, that routes optical signals among the N optical waveguides 214 without optical-waveguide crossing in optical routing layer 212 (because the optical crossing in cyclic de-multiplexer 216 may occur in free space). As noted above, the cyclic de-multiplexer may include: an AWG wavelength router and/or an echelle-grating wavelength router (which are, respectively, described further below with reference to FIGS. 2 and 3).

By using optical routing layer 212, MCM 200 may not need (and, thus, may not include) non-blocking dedicated optical channels among the N chips 210. Additionally, optical routing layer 212 may provide all-to-all connectivity among the N chips 210 (i.e., each of the N chips may be able to communicate concurrently with any of the other chips). Note that the point-to-point connectivity may include full-mesh, point-to-point connectivity (i.e., each of the N chips may be connected to all of the other chips and there may be direct communication between any pair of chips). Furthermore, note that the optical signals used to communicate among the N chips 210 may include at least N carrier wavelengths. Thus, each of the N optical waveguides 214 may convey the optical signals that include at least the N carrier wavelengths.

In some embodiments, optical waveguides 214 are edge coupled to the N chips 210 along a direction that is substantially perpendicular to edges of N chips 210 (i.e., edge-to-edge optical coupling). Therefore, optical waveguides 214 may be optically coupled to N chips 210 without interlayer optical coupling (i.e., without interlayer optical proximity coupling), which may reduce optical losses in MCM 200.

For example, the edge coupling may be facilitated by optional photonic bridges (such as optional bridge chip 218), which may be included in the plane of optical routing layer 212. The edge coupling may involve edge-coupled optical proximity communication in which a distance from an end or edge of an optical waveguide and a corresponding end or edge of an optical waveguide in a bridge chip may be less than the carrier wavelength associated with the optical signals conveyed in the optical waveguides. This optical coupling may (or may not) be mediated by additional components, such as gratings, mirrors, lenses and/or taper (or inverse taper) regions. Furthermore, the edge coupling may occur without mode converters at the edge of the optical waveguide or the corresponding chip (for example, if optical waveguides 214 have mode sizes of a few microns). However, if optical waveguides 214 have sub-micron mode sizes, then mode converters may be used at edges to reduce optical losses.) Furthermore, optical waveguides 214 in MCM 200 may act as both light emitters and collectors.

Figure 3:
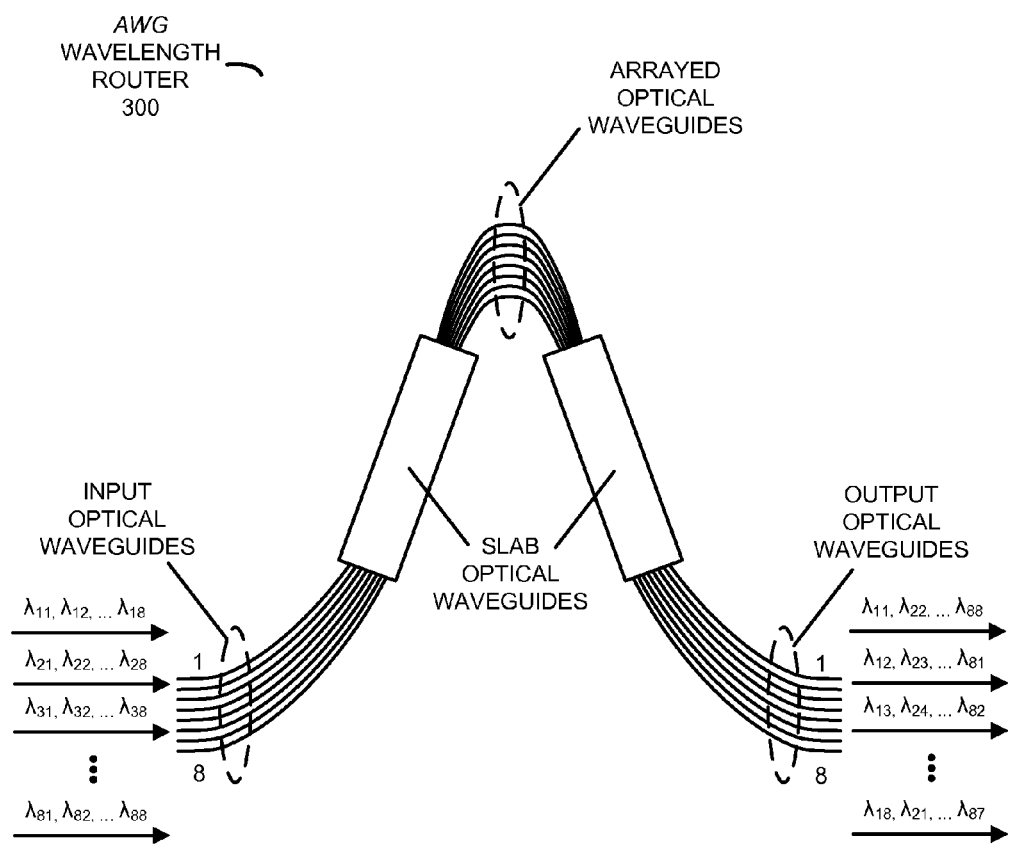
FIG. 3 is a block diagram illustrating an array-waveguide-grating (AWG) wavelength router for use in the MCM of FIG. 2 in accordance with an embodiment of the present disclosure.

As noted above, a cyclic AWG can be used to implement the N×N wavelength router. This AWG may sequentially de-multiplex the N carrier-wavelength channels in one input optical waveguide into N output waveguides. Furthermore, the N carrier-wavelength channels in a different input optical waveguide are also de-multiplexed into the same N output waveguides (but in a different order). As shown in FIG. 3, which presents a block diagram illustrating an AWG wavelength router 300 for use in MCM 200 (FIG. 2), eight carrier-wavelength channels (horizontal) in input optical waveguide 1 are routed to eight different output optical waveguides (vertical) with an order of $\lambda_1, \lambda_2, \ldots \lambda_8$ for output optical waveguides 1 to 8. Similarly, eight carrier-wavelength channels (horizontal) in input optical waveguide 2 are routed to the same eight output optical waveguides (vertical), but with a permutated order of $\lambda_2, \lambda_3, \ldots \lambda_1$ for output optical waveguides 1 to 8. This wavelength de-multiplexing and permutation is repeated for all the carrier-wavelength channels in all the input optical waveguides, thereby effectively establishing an 8×8 full-mesh connectivity.

Figure 4:
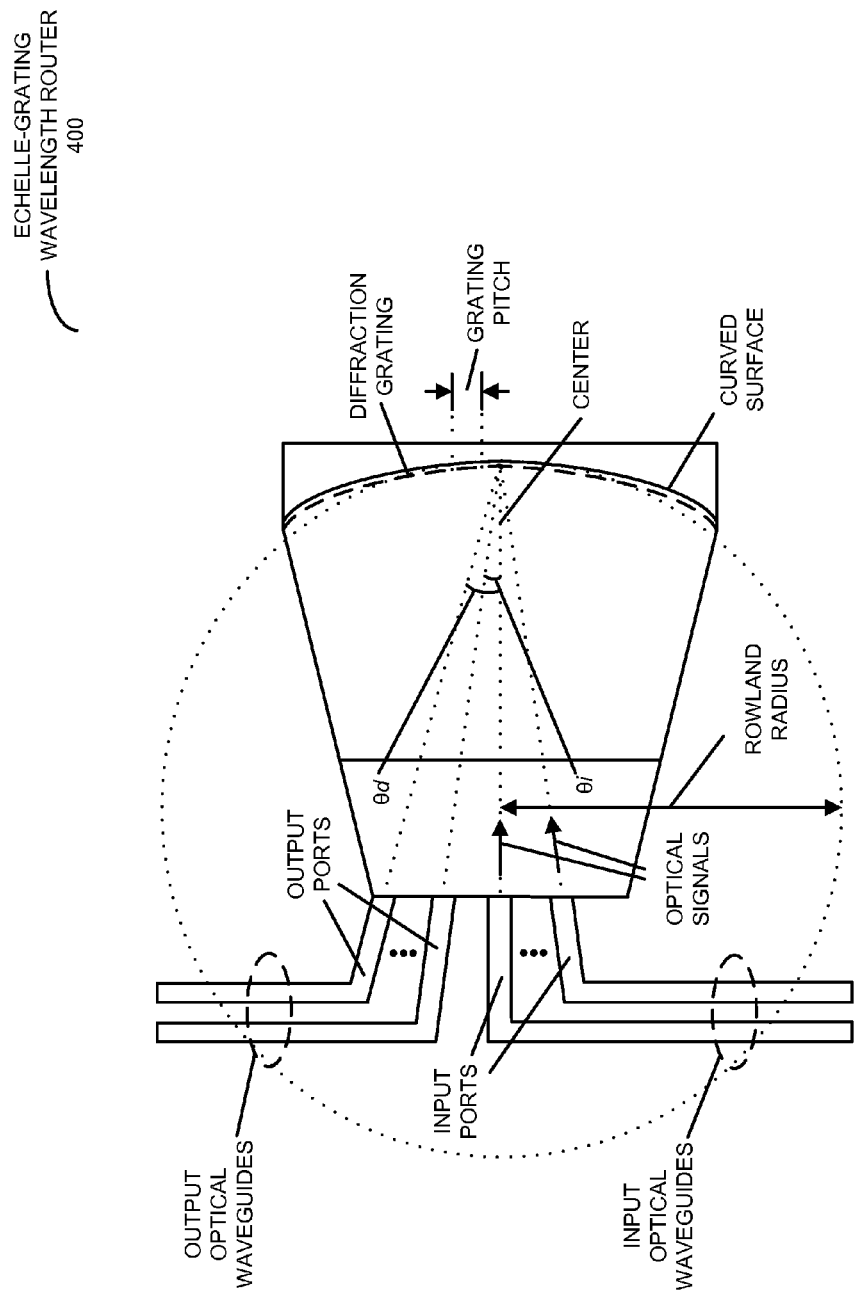
FIG. 4 is a block diagram illustrating an echelle-grating wavelength router for use in the MCM of FIG. 2 in accordance with an embodiment of the present disclosure.

In another embodiment, the N×N wavelength router can be implemented using echelle grating. As shown in FIG. 4, which presents a block diagram illustrating an echelle-grating wavelength router 400 for use in MCM 200 (FIG. 2), an echelle grating images and diffracts optical signals (which are received on input port(s), for example, from input optical waveguide(s)) using a reflective geometry. In the process, the optical signals may be coupled on different diffraction orders of the echelle grating to output ports, and then to output optical waveguides. Thus, an echelle grating may constitute a wavelength filter that selectively couples carrier wavelengths between input ports and output ports.

For example, echelle-grating wavelength router 400 may include a diffraction grating on a curved surface having a radius of twice the Rowland radius. Thus, an incidence angle ($\theta_i$) associated with the given diffraction order may be different than a diffraction angle ($\theta_d$) associated with the given diffraction order. Note that a grating pitch of the diffraction grating may be greater than or equal to 20 µm and/or the Rowland radius may be less than 1 mm.

By selecting a proper diffraction order and grating pitch, a 1×N echelle-grating de-multiplexer can be designed with a cyclic-frequency output. For example, by adding additional input ports matching the grating equation for the same set of output ports, an N×N wavelength router can be implemented. Such an N×N echelle-grating wavelength router has the same wavelength routing capability as an N×N AWG wavelength router. Therefore, it can be used to build a single-layer, full-mesh, point-to-point network for interconnects in an MCM without optical-waveguide crossing.

In an exemplary embodiment, the wavelength routing capability of a cyclic de-multiplexer is used to provide a full-mesh interconnect network for an MCM using a single photonic layer without optical-waveguide crossing. As shown in FIG. 2, a 4×4 MCM can be interconnected through a cyclic de-multiplexer 216 with 16 input ports and 16 output ports. The 16 chip sites of the 4×4 MCM may be arranged in a 2-dimensional array. Each site may have one output optical-waveguide port and one input optical-waveguide port with 16 carrier-wavelength channels. All the output ports of the 16 sites may be routed in order and optically coupled to the input of 16-port cyclic de-multiplexer 216, while all the input ports may be routed in order and optically coupled to the output of cyclic de-multiplexer 216.

In this way, the 16 carrier-wavelength channels in each input optical waveguide can be de-multiplexed into 16 output optical waveguides. Furthermore, the order of the carrier-wavelength channels from the different input ports can be cyclically rotated in the output ports. Note that in MCM 200, each site may be interconnected to every other site with one carrier-wavelength channel. All-to-all full-mesh connectivity may be achieved via wavelength routing through cyclic de-multiplexer 216 in a single photonic layer without optical-waveguide crossing. Furthermore, at each site, edge-coupled optical proximity coupling can be used to convey optical signals from bridge chips to the routing layer. These bridge chips can be positioned in the same layer as the routing layer, thereby achieving a fully connected, point-to-point or full-mesh or all-to-all connectivity using a single routing layer.

In general, in order to provide this functionality, at least N carrier wavelengths need to be available to each site for an MCM with N sites of chips. As a consequence, the number of carrier wavelengths available to the system (e.g., the number of wavelength-division-multiplexing or WDM wavelengths) usually must be equal to or larger than the size of the MCM (i.e., the number of sites). However, it is possible to use more than one carrier wavelength per site to increase the number of channels and, thus, the bandwidth available for communication to every other site. For example, with a 4×4 MCM and N equal to 16 sites, the use of 2·N carrier wavelengths (i.e., 32 carrier wavelengths) per site and a corresponding 32 carrier-wavelength cyclic de-multiplexer 216 can provide two independent carrier-wavelength channels from any site to every other site. This is equivalent to 'pretending' that there are 32 sites, but routing two optical waveguides to each of the 16 sites. These 32 carrier wavelengths can be reused by each site to connect to respective other sites.

As described above, in order to scale up the bandwidth between the sites, one can use more input/output carrier wavelengths and/or optical waveguides, in which case each interconnect in FIG. 2 may represent M independent optical wavelengths and carrier waveguides. Furthermore, in order to maintain the full-mesh interconnection, 16·M carrier-wavelength channels may be used for each site. In these embodiments, cyclic de-multiplexer 216 has 16·M input ports and 16·M output ports. Therefore, the maximum size of cyclic de-multiplexer 216 limits the total bandwidth of the network. Note that AWG wavelength routers with 32 ports have been demonstrated, and 64 port and even 128 port devices can be achieved in the near future. Assuming all input ports are communicating on all carrier wavelengths at a given time (all-to-all communication), and a data rate of 20 Gbps per carrier wavelength, with 64 ports and 64 carrier wavelengths the peak bisection bandwidth inside cyclic de-multiplexer 216 is 80 Tbps. Note that there are no optical-waveguide crossings necessary in such an MCM.

In principle, the approach illustrated in FIG. 2 is scalable for interconnects in an arbitrary N×N MCM. Assuming M carrier-wavelength channels are used to interconnect any two sites, one can then use $N^2 \cdot M$ carrier-wavelength channels for each optical waveguide, and an $N^2 \cdot M \times N^2 \cdot M$ cyclic de-multiplexer 216 as the wavelength routing device to interconnect all the sites in a single-photonic layer free of optical-waveguide crossing. Bandwidth scaling can also be implemented using an $N^2 \times N^2$ cyclic wavelength band router as the routing device, in conjunction with: N·M×1 wavelength multiplexers and an N×1 band multiplexer before each router input port; and 1×N band de-multiplexers and 1×M wavelength de-multiplexers after each wavelength-router output port. The band multiplexer/de-multiplexer and the cyclic band wavelength router in this example may be designed to: have channel spacing slightly larger than $M \times \delta\lambda$, where $\delta\lambda$ is the channel-wavelength spacing; and an optical pass band large enough for the M carrier-wavelength channels. Such a two-tier bandwidth scalable wavelength router may have all the M-channel multiplexers/de-multiplexers and N-channel band multiplexers/de-multiplexers located on each site to minimize the number of optical-waveguide couplings from the site to the routing layer. Moreover, the wavelength multiplexers/de-multiplexers can be implemented using technologies such as ring resonators, AWGs, echelle gratings, etc.

Note that the interconnect in the MCM provides a common loss and latency for all channels. In principle, the differences between the channels are due to differences in the lengths of the optical waveguides (as opposed to the need for additional components). Another consequence of this single-layer routing topology is that it is possible to 'remote' one or more sites in the MCM. In particular, instead of routing one or more of the optical waveguides to a given site, they can be routed to the edge of the MCM routing wafer. For example, in FIG. 2 the optical waveguides that respectively represent the input and output from the top left site can instead be directly routed, respectively, to the left side and the right side of the MCM routing wafer or substrate. Then, the optical waveguides on the routing wafer or substrate can be connected to optical fibers (not shown), for example, by using edge coupling of an optical waveguide to an optical fiber. In some embodiments, a tapered optical waveguide or inverse-tapered optical waveguide may be used to match the size of the optical-waveguide mode to that of the optical fiber. Because the optical-fiber loss is significantly less than the loss of the optical waveguide (a kilometer of optical fiber may have the same loss as a centimeter of optical waveguide), the optical-loss budget for the site may readily permit such 'remoting' of the site. This capability may be useful in many system applications, for example, to: other MCMs, other memory sites, banks of fiber-optically connected memory, other switches, or other routers.

Figure 5:
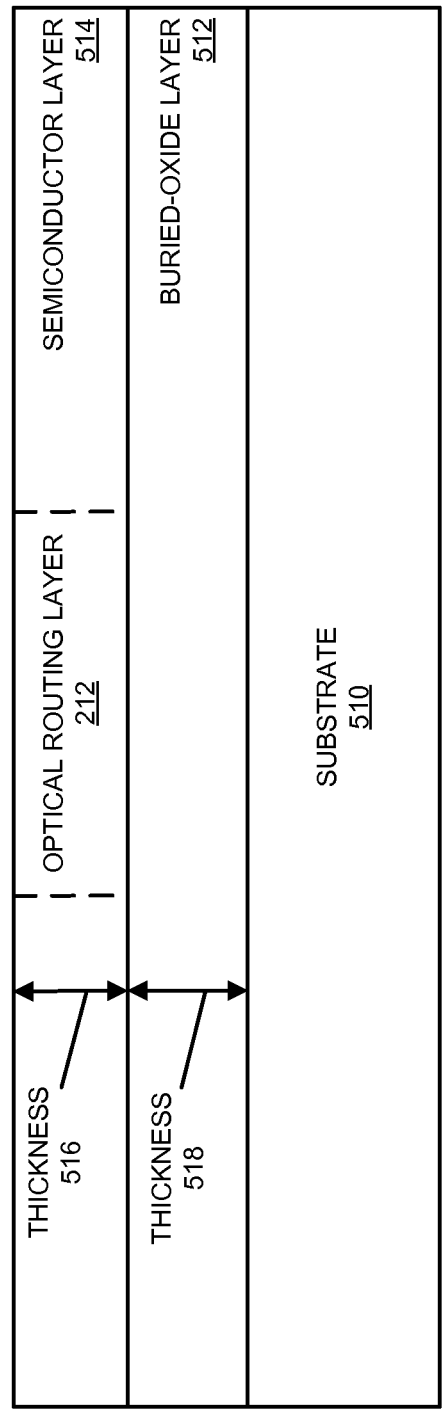
FIG. 5 is a block diagram illustrating an MCM in accordance with an embodiment of the present disclosure.

The MCM may be implemented using SOI technology. This is illustrated in FIG. 5, which presents a block diagram illustrating a side view of an MCM 500. In particular, MCM 500 may include: a substrate 510; a buried-oxide layer 512 disposed on substrate 510; and a semiconductor layer 514 disposed on buried-oxide layer 512, where optical-routing layer 212 is included in semiconductor layer 514. For example, substrate 510 and/or semiconductor layer 514 may include a semiconductor, such as silicon.

In an exemplary embodiment, the optical signals in the optical waveguides have wavelengths between 1.1-1.7 µm, such as an optical signal having a fundamental wavelength of 1.3 or 1.55 µm. Moreover, semiconductor layer 514 may have a thickness 516 that is less than 1 µm (such as 0.25-0.3 µm). Furthermore, buried-oxide layer 512 may have a thickness 518 between 0.3 and 3 µm (such as 0.8 µm).

The parameters for an exemplary design of an echelle grating are provided in Table 1.

TABLE 1

| Channel count | 8 |
| Channel spacing (nm) | 1.6 |
| Optical crosstalk (dB) | 20-25 |
| Footprint (µm$^2$) | 500 × 200 |
| Insertion loss | <3 dB |
| Carrier wavelength (nm) | 1550 |
| FSR (nm) | 12.8 |
| Thickness 516 (nm) | 300 |
| Diffraction order | 90 |
| Effective focal length (µm) | 150 |
| Grating pitch (µm) | 25 |

Figure 6:
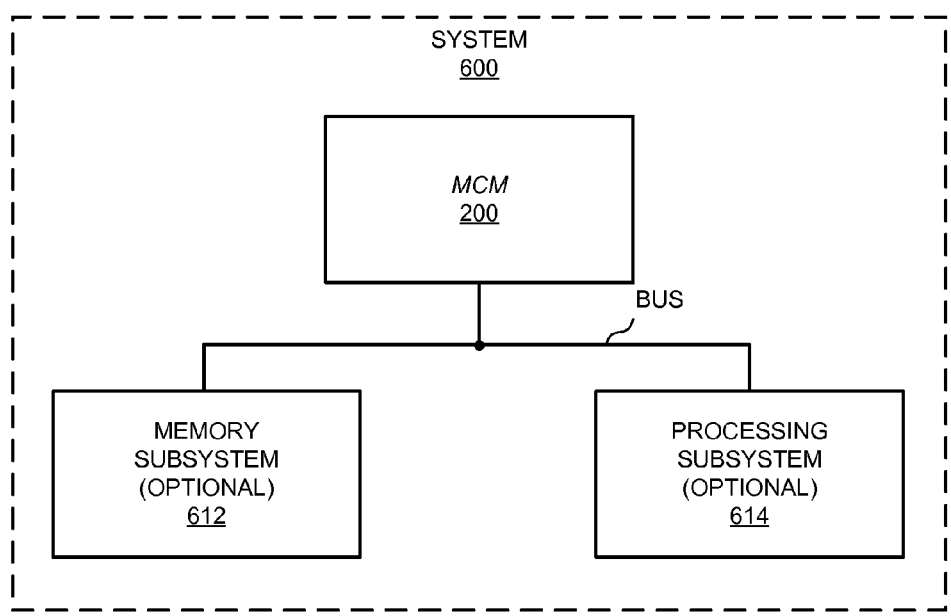
FIG. 6 is a block diagram illustrating a system that includes the MCM of FIG. 2 in accordance with an embodiment of the present disclosure.

The MCM may be used in a variety of applications. This is shown in FIG. 6, which presents a block diagram illustrating a system 600 that includes MCM 200.

System 600 may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a tablet computer, a supercomputer, a network-attached-storage (NAS) system, a storage-area-network (SAN) system, and/or another electronic computing device. Note that a given computer system may be at one location or may be distributed over multiple, geographically dispersed locations.

Moreover, the MCM, as well as system 600, may include fewer components or additional components. Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed.

In addition, functionality in the preceding embodiments of the integrated circuits and the system may be implemented more in hardware and less in software, or less in hardware and more in software, as is known in the art. For example, functionality may be implemented in one or more application-specific integrated circuits (ASICs) and/or one or more digital signal processors (DSPs). As shown in FIG. 6, system 600 may include one or more program modules or sets of instructions stored in an optional memory subsystem 612 (such as DRAM or another type of volatile or non-volatile computer-readable memory), which may be executed by an optional processing subsystem 614. Note that the one or more computer programs may constitute a computer-program mechanism. Furthermore, instructions in the various modules in optional memory subsystem 612 may be implemented in: a high-level procedural language, an object-oriented programming language, and/or in an assembly or machine language. Note that the programming language may be compiled or interpreted, e.g., configurable or configured, to be executed by optional processing subsystem 614.

Figure 7:
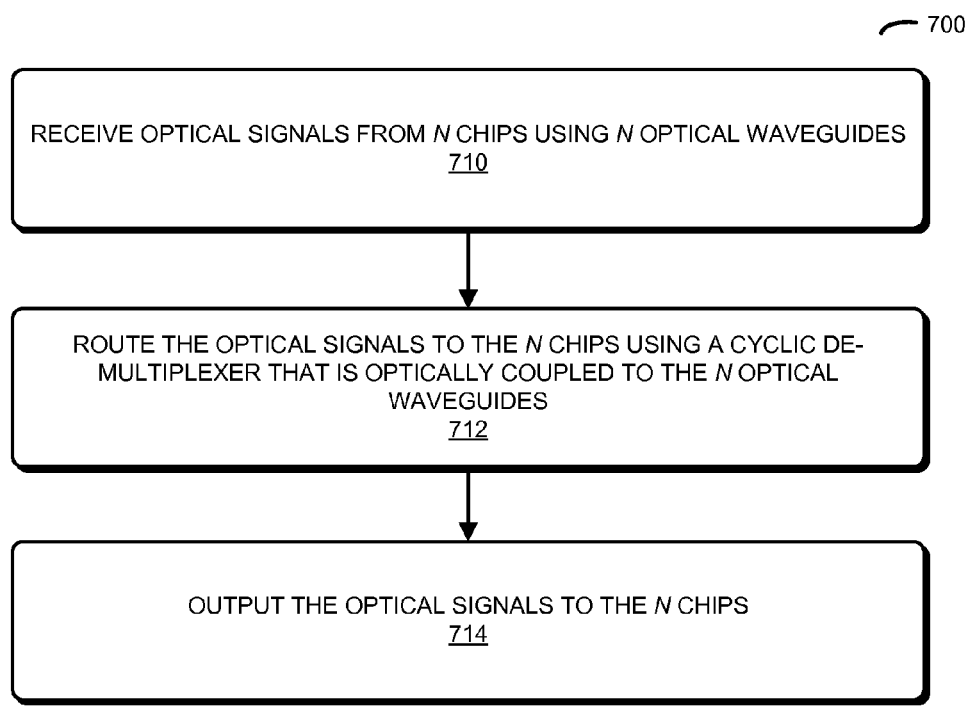
FIG. 7 is a flow chart illustrating a method for communicating among N chips in the MCM of FIG. 2 in accordance with an embodiment of the present disclosure.

We now describe embodiments of the method. FIG. 7 presents a flow chart illustrating a method 700 for communicating among N chips in MCM 200 (FIG. 2). During operation, the MCM receives the optical signals from the N chips using the N optical waveguides (operation 710), where the N optical waveguides are included the single optical routing layer that provides point-to-point connectivity among the N chips. Then, the MCM routes the optical signals to the N chips using the cyclic de-multiplexer that is optically coupled to the N optical waveguides (operation 712), where the cyclic de-multiplexer routes the optical signals among the N optical waveguides without optical waveguide crossing in the optical routing layer. Moreover, the MCM outputs the optical signals to the N chips (operation 714).

In some embodiments of method 700 there are additional or fewer operations. Moreover, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A multi-chip module (MCM), comprising:
   N chips; and
   a single optical routing layer that provides point-to-point connectivity among the N chips, wherein the optical routing layer comprises:
   N input optical waveguides optically coupled to the N chips;
   N output optical waveguides optically coupled to the N chips; and
   a cyclic de-multiplexer, optically coupled to the N input optical waveguides, that receives optical signals from the N input optical waveguides without optical waveguide crossing in the optical routing layer, wherein the cyclic de-multiplexer is further optically coupled to the N output optical waveguides, that de-multiplexes the received optical signals into the N output optical waveguides without optical waveguide crossing in the optical routing layer.

2. The MCM of claim 1, wherein the cyclic de-multiplexer includes an array-waveguide-grating (AWG) wavelength router.

3. The MCM of claim 1, wherein the cyclic de-multiplexer includes an echelle-grating wavelength router.

4. The MCM of claim 1, wherein the optical routing layer excludes non-blocking dedicated optical channels among the N chips.

5. The MCM of claim 1, wherein the optical waveguides are edge coupled to the N chips.

6. The MCM of claim 1, wherein the optical waveguides are optically coupled to the N chips without interlayer optical coupling.

7. The MCM of claim 1, wherein the optical routing layer provides all-to-all connectivity among the N chips.

8. The MCM of claim 1, further comprising a substrate, wherein the optical routing layer is disposed on the substrate.

9. The MCM of claim 8, further comprising:
a buried-oxide layer; and
a semiconductor layer disposed on the buried-oxide layer, wherein the optical routing layer is disposed on the semiconductor layer; and
wherein the substrate, the oxide layer, and the semiconductor layer comprise a silicon-on-insulator technology.

10. The MCM of claim 1, wherein the optical signals used to communicate among the N chips in the MCM include at least N carrier wavelengths.

11. The MCM of claim 1, wherein the point-to-point connectivity includes full-mesh point-to-point connectivity.

12. A system, comprising:
a processor;
a memory storing a program module that is configured to be executed by the processor; and
an MCM, wherein the MCM includes:
N chips; and
a single optical routing layer that provides point-to-point connectivity among the N chips, wherein the optical routing layer comprises:
N input optical waveguides optically coupled to the N chips;
N output optical waveguides optically coupled to the N chips; and
a cyclic de-multiplexer, optically coupled to the N input optical waveguides, that receives optical signals from the N input optical waveguides without optical waveguide crossing in the optical routing layer, wherein the cyclic de-multiplexer is further optically coupled to the N output optical waveguides, that de-multiplexes the received optical signals into the N output optical waveguides without optical waveguide crossing in the optical routing layer.

13. The system of claim 12, wherein the cyclic de-multiplexer includes one of: an AWG wavelength router and an echelle-grating wavelength router.

14. The system of claim 12, wherein the optical routing layer excludes non-blocking dedicated optical channels among the N chips.

15. The system of claim 12, wherein the optical waveguides are edge coupled to the N chips.

16. The system of claim 12, wherein the optical waveguides are optically coupled to the N chips without interlayer optical coupling.

17. The system of claim 12, wherein the optical routing layer provides all-to-all connectivity among the N chips.

18. The system of claim 12, further comprising:
a substrate;
a buried-oxide layer; and
a semiconductor layer disposed on the buried-oxide layer, wherein the optical routing layer is disposed on the semiconductor layer; and
wherein the substrate, the oxide layer, and the semiconductor layer comprise a silicon-on-insulator technology.

19. The system of claim 12, wherein the optical signals used to communicate among the N chips in the MCM include at least N carrier wavelengths.

20. A method for communicating among N chips in an MCM, wherein the method comprises:
receiving optical signals from the N chips using N input optical waveguides, wherein the N input optical waveguides are included in a single optical routing layer that provides point-to-point connectivity among the N chips, wherein the N chips are further coupled to N output optical waveguides;
routing the optical signals to the N chips using a cyclic de-multiplexer that is optically coupled to the N input optical waveguides, wherein the cyclic de-multiplexer receives the optical signals from the N input optical waveguides without optical waveguide crossing in the optical routing layer; and
outputting the optical signals to the N chips, wherein the cyclic de-multiplexer is further optically coupled to the N output optical waveguides, that de-multiplexes the received optical signals into the N output optical waveguides without optical waveguide crossing in the optical routing layer.

* * * * *